United States Patent
Pfertner et al.

(10) Patent No.: US 6,719,357 B2
(45) Date of Patent: Apr. 13, 2004

(54) PASSENGER CAR HAVING A FLAP SWIVELLABLY LINKED BY WAY OF A HINGE DEVICE TO THE CAR BODY

(75) Inventors: Kurt Pfertner, Ditzingen (DE); Reiner Armbruster, Muehlacker (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/227,522

(22) Filed: Aug. 26, 2002

(65) Prior Publication Data

US 2003/0057732 A1 Mar. 27, 2003

(30) Foreign Application Priority Data

Aug. 25, 2001 (DE) .......................................... 101 41 789

(51) Int. Cl.7 .................................................. B60J 5/10
(52) U.S. Cl. .......................... 296/146.8; 296/56; 296/76
(58) Field of Search ................................ 296/180.5, 50, 296/56, 57.1, 76, 107.8, 146.8

(56) References Cited

U.S. PATENT DOCUMENTS

| | | | | |
|---|---|---|---|---|
| 2,668,320 A | * | 2/1954 | Lustig | ........................ 296/76 |
| 4,679,841 A | | 7/1987 | Taunay | |
| 5,074,609 A | | 12/1991 | Dear | ........................ 296/76 |
| 6,254,165 B1 | * | 7/2001 | Neubrand | .................... 296/76 |

FOREIGN PATENT DOCUMENTS

| | | | |
|---|---|---|---|
| DE | 29 37 166 | | 4/1981 |
| DE | 32 43 831 | | 2/1984 |
| DE | 35 15 100 | | 10/1986 |
| DE | 36 19 943 | | 12/1987 |
| DE | 3619943 | | 12/1987 |
| DE | 3917967 A1 | * | 8/1990 .................. 296/76 |
| DE | 29701617 | | 5/1997 |
| DE | 19963428 | | 3/2001 |
| DE | 19948461 | | 5/2001 |

OTHER PUBLICATIONS

Search Report.

\* cited by examiner

*Primary Examiner*—Jason Morrow
(74) *Attorney, Agent, or Firm*—Crowell & Moring LLP

(57) ABSTRACT

A motor vehicle having a flap, which is implemented, for example, as a tail gate, and is swivellably linked by way of a hinge device to the body of the motor vehicle, and opens and closes a flap opening, which hinge device comprises a body-side and a flap-side fitting part, and the two fitting parts are swivellably connected relative to one another by way of at least one multi-control-arm arrangement having at least two control arms. For adjusting the flap relative to the body of the motor vehicle, the flap-side fitting part for the fastening to the flap is provided with at least one oblong hole, and between the flap-side fitting part and the flap, an adjusting slide is arranged which has at least a second oblong hole, in which case a fastening element reaches through the two oblong holes and is fastened to the flap, and the second oblong hole extends at an angle ($\alpha$) with respect to the first oblong hole, this angle ($\alpha$) amounting to more than 0° and less than 90°.

17 Claims, 2 Drawing Sheets

PASSENGER CAR HAVING A FLAP SWIVELLABLY LINKED BY WAY OF A HINGE DEVICE TO THE CAR BODY

BACKGROUND AND SUMMARY OF THE INVENTION

This application claims the priority of Application No. 101 41 789.6, filed Aug. 25, 2001, in Germany, the disclosure of which is expressly incorporated by reference herein.

The invention relates to a motor vehicle, particularly a passenger car, having a flap swivellably linked by way of a hinge device to the body of a vehicle, which hinge device comprises a body-side and a flap-side fitting part which are swivellably connected relative to one another by means of at least one multi-control-arm arrangement having at least two control arms, A vehicle of the above-mentioned type is described, for example, in German Patent Document DE 36 19 943 A1. It has a tail gate which is swivellably held by way of a hinge device at the body of the motor vehicle so that a tail gate opening can be closed or opened. The hinge device comprises a vehicle-body-side and a tail-gate-side fitting part which are swivellably connected relative to one another by means of at least one multi-control arm arrangement having at least two control arms. The multi-control arm arrangement is constructed as a four-bar linkage in the known vehicle and therefore has two control arms.

It is an object of the invention to provide a motor vehicle of the initially mentioned type in the case of which the swivellably linked flap can be aligned relative to the flap opening.

This object is achieved according to preferred embodiments of the invention by means of a motor vehicle, particularly a passenger car, having a flap, for example, a tail gate, swivellably linked by way of a hinge device to the body of the motor vehicle, for opening and closing a flap opening, which hinge device comprises a body-side and a flap-side fitting part which are swivellably connected relative to one another by means of at least one multi-control-arm arrangement having at least two control arms, wherein a flap-side fitting part for fastening to the flap, has at least one oblong hole, wherein between the flap-side fitting part and the flap, an adjusting slide is arranged which has at least a second oblong hole, wherein a fastening element reaches through the two oblong holes and is fastened to the flap, and wherein the second oblong hole extends at an angle (α) with respect to the first oblong hole, this angle (α) amounting to more than 0° and less than 90°. Additional characteristics further developing the invention are contained in the following description and claims.

Principal advantages achieved by the invention are that the flap swivellably linked to the body can be adjusted with respect to the body or relative to the flap opening, whereby when the flap, for example, a tail gate, is closed, defined gap measurements are obtained between the flap and the vehicle body surrounding the flap opening. In addition, by means of the suggested construction of the hinge device, this adjustment can be carried out in a simple manner and without major expenditures.

In addition, the arrangement of the two oblong holes, which are offset by an angle with respect to one another, provides a continuous and very precise adjusting possibility.

In a further development according to certain preferred embodiments of the invention, it is advantageous that the adjusting possibility of the flap with respect to the vehicle body is expanded by a second adjusting device with the body-side hinge part displacedly arranged with respect to the vehicle body.

When the multi-control-arm arrangement is a four-bar linkage according to certain preferred embodiments of the invention, an advantageous opening course of the flap is obtained, first a lifting-out of the flap and then a swivelling opening being provided here, in particular.

According to a further development of certain preferred embodiments of the invention, an adjusting possibility of the flap approximately in the direction of the vertical axis of the vehicle is obtained, whereby the flap can be aligned in its closed position with respect to a flap sealing device arranged on the vehicle body. In addition, the flap can be adjusted inside the flap opening by a displacement.

Other objects, advantages and novel features of the present invention will become apparent from the following detailed description of the invention when considered in conjunction with the accompany drawings.

DETAILED DESCRIPTION OF THE DRAWINGS

Figure 1:
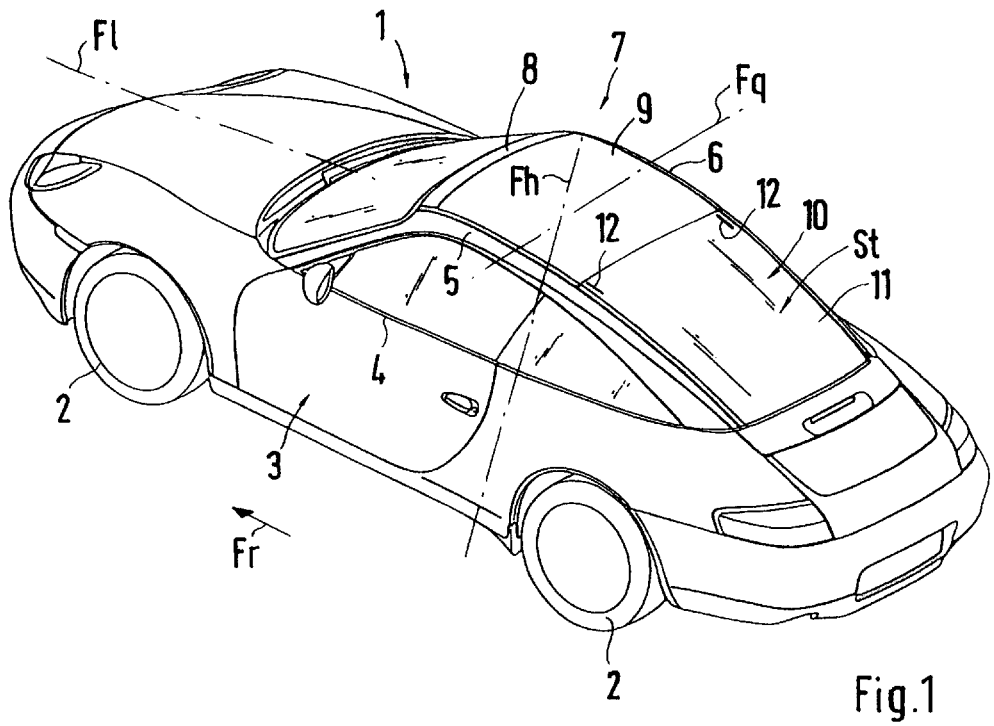
FIG. 1 is a perspective view of a motor vehicle having a tail gate constructed according to a preferred embodiment of the invention.

FIG. 1 illustrates a motor vehicle 1, particularly a passenger car, having a body 3 carried by wheels 2. Above a belt line 4 of the body, a roof arrangement 7 is inserted between roof side members 5 and 6 extending in a curved manner above the belt line 4, which roof arrangement 7 has a cover, particularly a sliding cover 9, which at least partially opens and closes a roof opening 8. This sliding cover 9 can be lowered and can be pushed under a flap 10 against the driving direction Fr. The roof side members may be parts of the vehicle body 3. The flap 10 is preferably a tail gate into which a window 11 is inserted. Furthermore, the flap 10 is swivellably linked to the body 3 of the vehicle by way of, for example, two hinge devices 12, so that it can be opened against the driving direction Fr and, in the closed position St, closes off a flap opening 13 bounded by the vehicle body. In addition, a flap sealing device Dg, which is assigned to the flap opening 13, may be arranged on the body 3 of the vehicle or the interior side of the tail gate 10. In the closed position St, the tail gate sealingly rests on this flap sealing device Dg.

Figure 3:
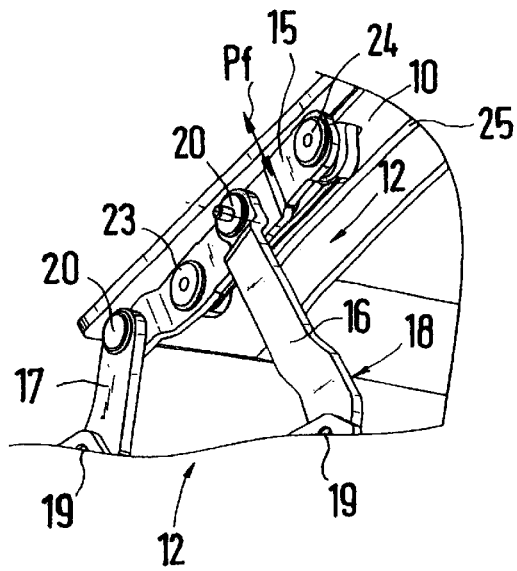
FIG. 3 is a second perspective view of the tail gate of the FIG. 1 arrangement shown situated in the partial opening position.
Figure 4:
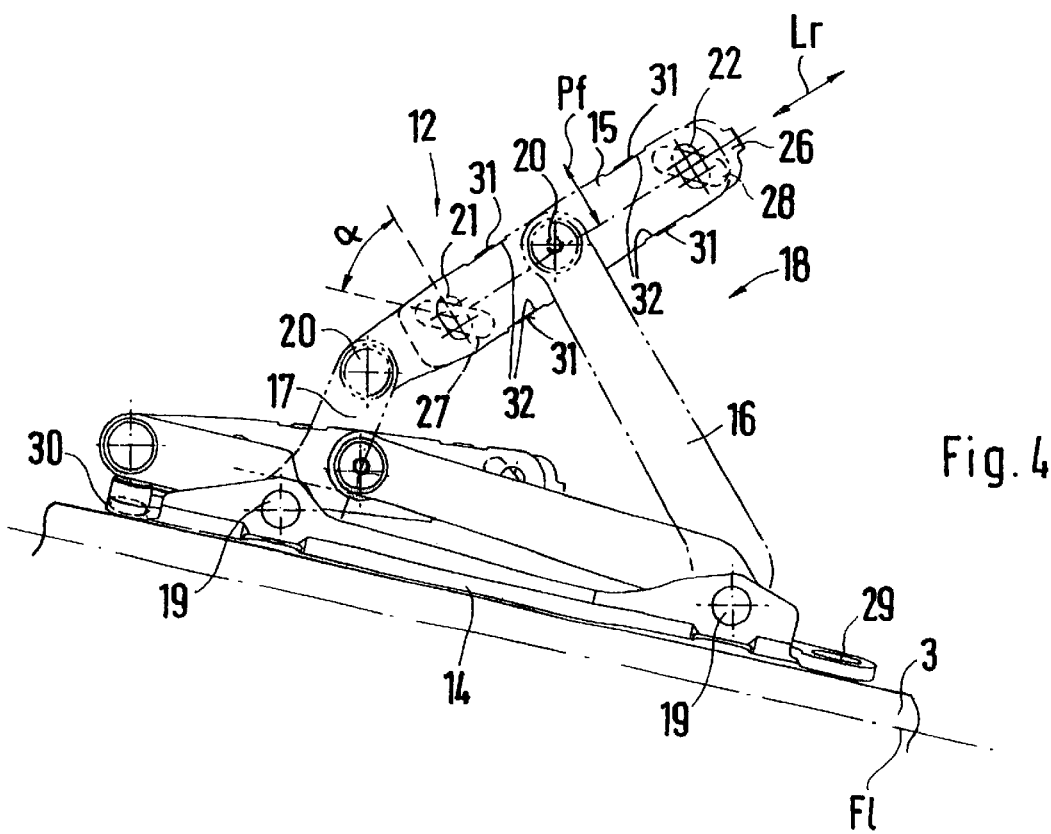
FIG. 4 is a view of a hinge device for the tail gate of the vehicle of FIGS. 1–3.

According to FIG. 4, the hinge device 12 has two fitting parts, a body-side fitting part 14 being connected with the body 3 and a flap-side fitting part 15 being connected with the flap 10, as also illustrated in FIG. 3. The two fitting parts 14 and 15 are swivellably connected relative to one another by way of a multi-control-arm arrangement 18 comprising at least two control arms 16 and 17. Each control arm 16 and 17 is in each case connected by way of a first swivelling axis 19 with the body-side fitting part 14 and is linked by way of a second swivelling axis 20 respectively to the flap-side fitting part 15. FIG. 4 also shows the multi-control-arm arrangement 18 by means of solid lines when the tail gate 10 is in the closed position St and by means of dash-dotted contours when the tail gate 10 is in the open position.

The flap-side fitting part 15 is provided with two mutually spaced first oblong holes 21 and 22, through which the preferably releasable fastening elements 23 and 24 (FIG. 3) reach and are fastened to the tail gate 10, particularly at its preferably surrounding flap frame 25 which is situated on the interior side of the flap. The fastening devices 23 and 24 are preferably constructed as screws which, by means of their thread, are screwed into the flap frame 25. Between the flap 10 and the flap-side fitting part 15, an adjusting slide 26 is arranged which has two mutually spaced second oblong holes 27 and 28, each of which extending at an angle α to the first oblong hole 21 and 22 respectively assigned to it, this angle α being larger than 0° and smaller than 90°, and in the illustrated embodiment amounting to approximately 45°. During a displacement in the longitudinal direction Lr of the adjusting slide 26 relative to the flap-side fitting part 15, the flap-side fitting part 15 is moved relative to the flap 10, and the fastening elements 23 and 24 are displaced parallel inside the respective oblong hole 21 and 22 respectively at a right angle with respect to the longitudinal direction Lr, whereby the tail gate 10 can be continuously adjusted approximately in the direction of the vertical axis Fh of the vehicle in its distance from the vehicle body 3 or with respect to the flap sealing device Dg, as illustrated by an arrow Pf in FIGS. 3 and 4. In the illustrated embodiment, the first oblong holes 21 and 22 are aligned approximately at a right angle with respect to the plane Eb for this purpose, in which plane Eb the tail gate 10 and the window 11 assigned thereto are situated.

Figure 2:
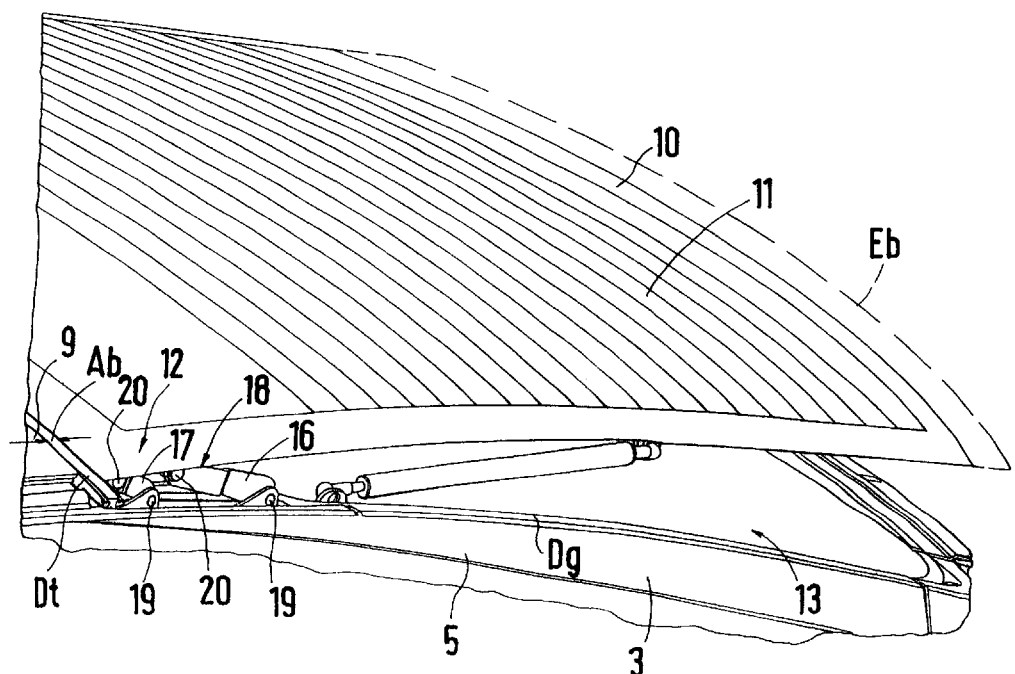
FIG. 2 is a first perspective view of the tail gate of the FIG. 1 arrangement shown situated in the partial opening position.

In addition, for adjusting the tail gate 10 within the flap opening 13, the body-side fitting part 14 can be displaced relative to the vehicle body 3. For this purpose, oblong holes 29 and 30 are provided on the body-side fitting part 14. The connection elements, which are not shown here, can be fixed in the vehicle body 3, reaching through these oblong holes 29 and 30. The oblong holes 29 and 30 are, for example, oriented such that an adjusting possibility of the tail gate 10 is obtained approximately in the direction of the longitudinal axis Fl of the vehicle or transversely thereto, thus in the direction of the transverse vehicle axis Fq, whereby a precise adjustment Ab (FIG. 2) is made between the flap 10 and the sliding cover 9 or of the sealing device Dt arranged in-between.

The adjusting slide 26 may be constructed as a sheet metal part and is displaceably in the longitudinal direction Lr held on the flap-side hinge part 15. For this purpose, holding lugs 31 (FIG. 4) may be provided at the adjusting slide 26, which holding lugs 31 reach partially around the flap-side fitting part 15 and are preferably guided in grooves 32, which are formed in the flap-side fitting part 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle having a flap linked by way of a hinge device to a body of the motor vehicle, for opening and closing a flap opening, which hinge device comprises a body-side fitting part and a flap-side fitting part which are swivellably connected relative to one another by means of at least one multi-control-arm arrangement having at least two control arms, wherein the flap-side fitting part, for fastening to the flap, has at least a first oblong hole, wherein between the flap-side fitting part and the flap, an adjusting slide is arranged which has at least a second oblong hole, wherein a fastening element reaches through the first and second oblong holes and is fastened to the flap, and wherein the second oblong hole extends at an angle (α) with respect to the first oblong hole, this angle (α) amounting to more than 0° and less than 90°.

2. Motor vehicle according to claim 1, wherein the body-side fitting part is displaceably arranged with respect to the body of the motor vehicle.

3. Motor vehicle according to claim 1, wherein the at least one multi-control-arm arrangement is a four-bar linkage.

4. Motor vehicle according to claim 1, wherein the first oblong hole extends approximately at a right angle with respect to a plane of the flap, and wherein the body-side fitting part is held displaceably approximately in a direction of a longitudinal vehicle axis at the body of the motor vehicle.

5. Motor vehicle according to claim 2, wherein the body-side fitting part has at least one oblong hole, though which a connection element reaches, and wherein the at least one oblong hole is aligned approximately in a direction of a longitudinal vehicle axis.

6. Motor vehicle according to claim 4, wherein the body-side fitting part has at least one oblong hole, though which a connection element reaches, and wherein the at least one oblong hole is aligned approximately in a direction of a longitudinal vehicle axis.

7. A flap assembly for a vehicle comprising:

a flap operable in use to selectively open and close a vehicle body opening, a flap-side fitting part, said flap-side fitting part having a first oblong hole, an adjusting slide part, said adjusting slide part having a second oblong hole, a body-side fitting part, a control arm arrangement swivellably linking the flap-side fitting part and body-side fitting part to one another, and a fastener which extends through the first and second oblong holes and into the flap-side fitting part to fasten the adjusting slide part and flap-side fitting part together, wherein said first and second oblong holes are inclined to an angle with respect to one another.

8. A flap assembly according to claim 7, wherein said control arm arrangement is a four bar linkage.

9. A flap assembly according to claim 8, wherein, in use, the body-side fitting part is adjustably fixed to a vehicle body.

10. A flap assembly according to claim 7, wherein the flap is a vehicle tail gate.

11. A flap assembly according to claim 7, wherein said first oblong hole is one of a plurality of first oblong holes, wherein said second oblong hole is one of a plurality of second oblong holes, and wherein said fastener is on of a plurality of fasteners, respective ones of said fasteners extending through aligned pairs of said first and second oblong holes.

12. A flap assembly according to claim 11, wherein each lateral side of said flap is provided with respective flap-side fitting parts, adjusting slide parts, and body-side fitting parts.

13. Motor vehicle according to claim 7,
wherein the first oblong hole extends approximately at a right angle with respect to a plane of the flap, and
wherein the body-side fitting part is held displaceably approximately in a direction of a longitudinal vehicle axis at a vehicle body.

14. Motor vehicle according to claim 7,
wherein the body-side fitting part has at least one oblong hole, though which a connection element reaches, and
wherein the at least one oblong hole is aligned approximately in a direction of a longitudinal vehicle axis.

15. Motor vehicle according to claim 2,
wherein the body-side fitting part has at least one oblong hole, though which a connection element reaches, and
wherein the at least one oblong hole is aligned approximately at a right angle to a longitudinal vehicle axis.

16. Motor vehicle according to claim 4,
wherein the body-side fitting part has at least one oblong hole, though which a connection element reaches, and
wherein the at least one oblong hole is aligned approximately at a right angle to a longitudinal vehicle axis.

17. Motor vehicle according to claim 7,
wherein the body-side fitting part has at least one oblong hole, though which a connection element reaches, and
wherein the at least one oblong hole is aligned approximately at a right angle to a longitudinal vehicle axis.

* * * * *